(12) United States Patent  
Mchugh et al.

(10) Patent No.: US 7,740,430 B2  
(45) Date of Patent: Jun. 22, 2010

(54) SUPPORT ASSEMBLY FOR USE WITH TRUCK BED

(75) Inventors: Michael Patrick Mchugh, 1807 Case Rd., Columbus, OH (US) 43224; Charles Thomas Poston, Columbus, OH (US); Benjamin McCandless, Columbus, OH (US)

(73) Assignee: Michael Patrick Mchugh, Columbus, OH (US)

( * ) Notice: Subject to any disclaimer, the term of this patent is extended or adjusted under 35 U.S.C. 154(b) by 504 days.

(21) Appl. No.: 11/869,839

(22) Filed: Oct. 10, 2007

(65) Prior Publication Data

US 2009/0097938 A1  Apr. 16, 2009

(51) Int. Cl.  
*B60P 7/08* (2006.01)

(52) U.S. Cl. .................. 410/89; 410/121; 410/32; 410/143; 410/144

(58) Field of Classification Search ............ 410/89, 410/121, 143, 144, 152, 32; 224/403, 404, 224/405, 322, 565; 248/351  
See application file for complete search history.

(56) References Cited

U.S. PATENT DOCUMENTS

| | | | | |
|---|---|---|---|---|
| 6,471,455 B2 * | 10/2002 | Skiba | ............ | 410/38 |
| 7,156,592 B1 * | 1/2007 | Cava | ............ | 410/32 |

* cited by examiner

*Primary Examiner*—Stephen Gordon  
(74) *Attorney, Agent, or Firm*—Ronald J. Koch (57) ABSTRACT

A support assembly for use with truck bed comprises first mounting frame 5, second mounting frame 6, first horizontal arm portion 11, first vertical arm portion 12, first arm mounting holes 13, second horizontal arm portion 21, second vertical arm portion 22, first mounting end 24 of second vertical arm portion, distal, open end 25 of second horizontal arm portion, first support bracket 30, first vertical sleeve 40, second support bracket 50, second vertical sleeve 60, first brace 70, second brace 90, outer sleeve 100, first hitch pin assembly 110, and second hitch pin assembly 120.

7 Claims, 7 Drawing Sheets

SUPPORT ASSEMBLY FOR USE WITH TRUCK BED

BACKGROUND AND SUMMARY

The present invention relates generally to truck bed storage systems and specifically to racks that facilitate storage and transport of lengthy articles.

Pickup trucks are known as is the general structure of typical truck beds. They commonly have protrusions on both sides of the interior of the bed section near the rear of the vehicle. The trucks are helpful for the storage and transport of many items. Of particular interest are items that are lengthy and oftentimes extend beyond the rear gate of the truck. Storing and transporting such items is problematic because the operation of the rear gate of the truck is impeded because the lengthy articles are resting thereon. As a result, the lowering of the gate causes the articles to shift unnecessarily. Moreover, access to other, smaller items is often made difficult because the longer items shift when the gate is lowered.

Accordingly, it would be advantageous to have a support assembly that allows lengthy articles to remain un-shifted as the rear gate of the bed is lowered. Such a system allows a user to more fully access the inside of the truck bed. The present invention accomplishes this as well as provides other objects and advantages that will be apparent to those of skill in the art.

REFERENCE NUMERALS IN DRAWINGS

The table below lists the reference numerals employed in the figures, and identifies the element designated by each numeral.

1 support arm assembly 1
5 first mounting frame 5
6 second mounting frame 6
10 first support arm 10
11 first horizontal arm portion 11
12 first vertical arm portion 12
13 first arm mounting holes 13
14 first mounting end 14 of first vertical arm portion
15 distal, open end 15 of first horizontal arm portion
16 proximal end 16 of first horizontal arm portion
20 second support arm 20
21 second horizontal arm portion 21
22 second vertical arm portion 22
23 second arm mounting holes 23
24 first mounting end 24 of second vertical arm portion
25 distal, open end 25 of second horizontal arm portion
26 proximal end 26 of second horizontal arm portion
30 first support bracket 30
31 back face 31 of first support bracket
32 front face 32 of first support bracket
33 fastening holes 33 of first support bracket
34 outer face 34 of first support bracket
35 inner face 35 of first support bracket
36 top portion 36 of first support bracket
37 bottom portion 37 of first support bracket
40 first vertical sleeve 40
41 back face 41 of first vertical sleeve
42 front face 42 of first vertical sleeve
43 outer face 43 of first vertical sleeve
44 upper portion 44 of first vertical sleeve
45 mounting holes 45 of first vertical sleeve
47 inner face 47 of first vertical sleeve
50 second support bracket 50
51 back face 51 of second support bracket
52 front face 52 of second support bracket
53 fastening holes 53 of second support bracket
54 outer face 54 of second support bracket
55 inner face 55 of second support bracket
56 top portion 56 of second support bracket
57 bottom portion 57 of second support bracket
60 second vertical sleeve 60
61 back face 61 of second vertical sleeve
62 front face 62 of second vertical sleeve
63 outer face 63 of second vertical sleeve
64 upper portion 64 of second vertical sleeve
65 mounting holes 65 of second vertical sleeve
67 inner face 67 of second vertical sleeve
70 first brace 70
71 second mounting end 71 of first brace
72 fastening hole 72 of first brace
73 first mounting end 73 of first brace
90 second brace 90
91 second mounting end 91 of second brace
92 fastening hole 92 of second brace
93 first mounting end 93 of second brace
100 outer sleeve 100
110 first hitch pin assembly 110
111 first hitch pin 111
112 first hitch pin clip 112
120 second hitch pin assembly 120
121 second hitch pin 121
122 second hitch pin clip 122
130 elongated member 130
140 first vertical arm extension 140
141 first vertical arm extension cover 141
150 second vertical arm extension 150
151 second vertical arm extension cover 151
5A first mounting frame 5A of an alternative embodiment
6A second mounting frame 6A of an alternative embodiment
30A first support bracket 30A of an alternative embodiment
33A fastening holes 33A of first support bracket of an alternative embodiment
40A first vertical sleeve 40A of an alternative embodiment
45A mounting holes 45A of first vertical sleeve of an alternative embodiment
48A tab 48A of first vertical sleeve of an alternative embodiment
50A second support bracket 50A of an alternative embodiment
53A fastening holes 53A of second support bracket of an alternative embodiment
60A second vertical sleeve 60A of an alternative embodiment
65A mounting holes 65A of second vertical sleeve of an alternative embodiment 68A tab 68A of second vertical sleeve of an alternative embodiment

DETAILED DESCRIPTION

As shown in FIGS. 1-5, a preferred embodiment of the present invention comprises support arm assembly 1, first mounting frame 5, and second mounting frame 6.

Figure 1:
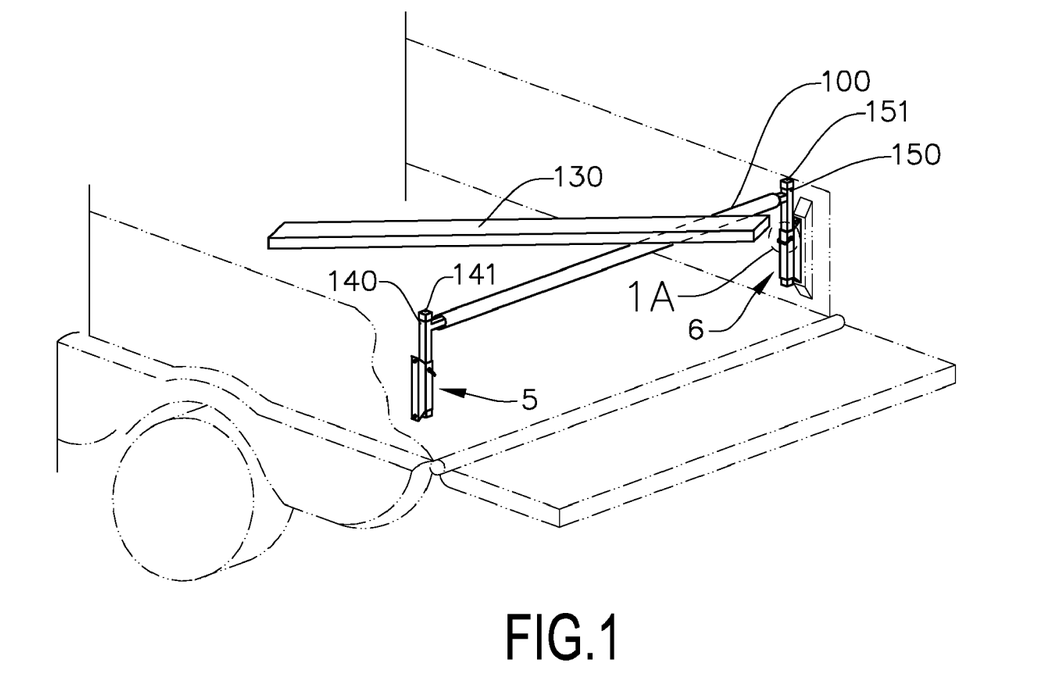
FIG. 1 depicts a perspective view of the invention attached to the bed of a pickup truck with an elongated member in storage
Figure 2:
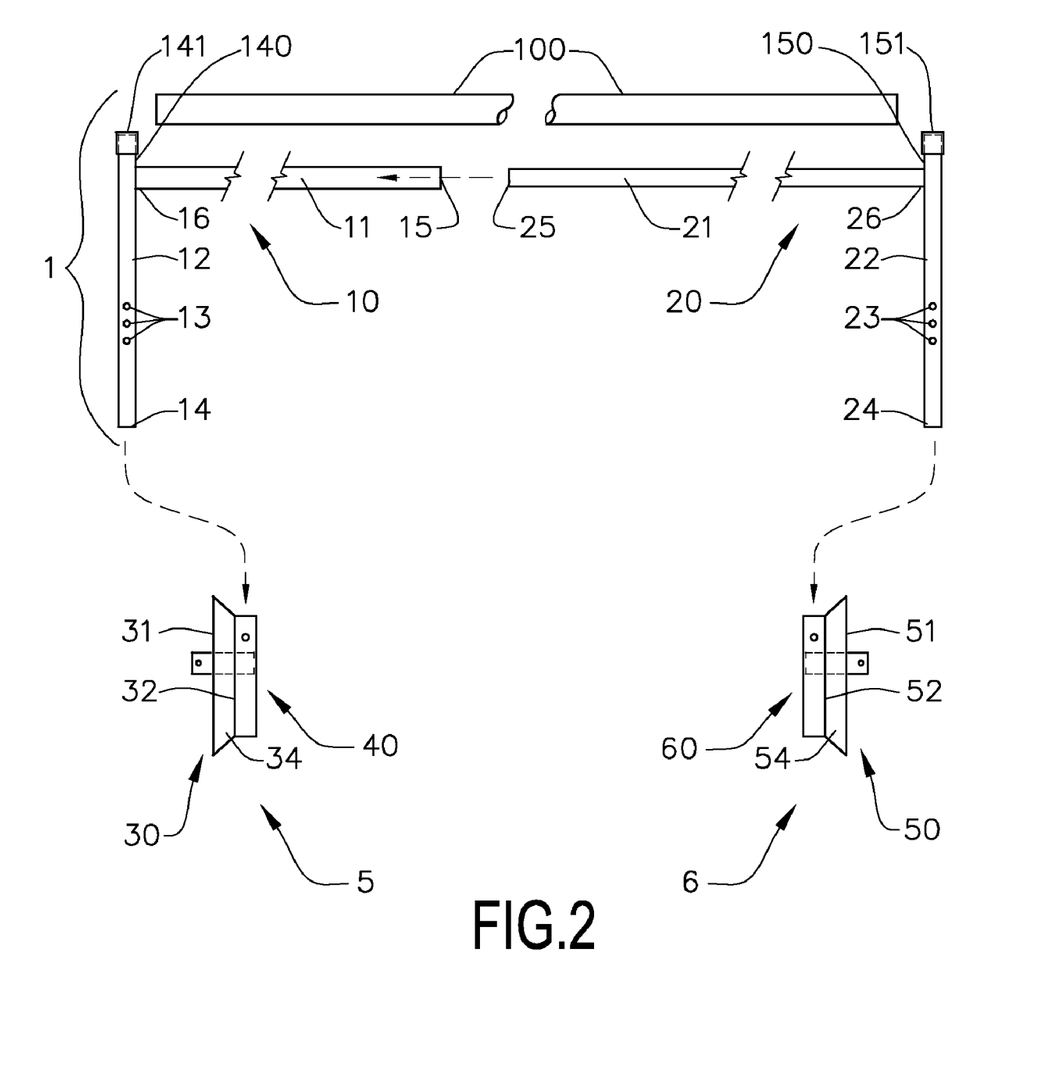
FIG. 2 depicts an exploded, fragmentary view, from the frontal perspective

Support arm assembly 1 comprises first support arm 10, second support arm 20, and outer sleeve 100.

First support arm 10, second support arm 20, first mounting frame 5, and second mounting frame 6 are preferably made of 14 gauge metal, but could be made of other materials such as wood or plastic, as long as the strength and rigidity of the members are not compromised. The metal members would preferably have a powder coat finish, but could have other finishes such as paint, or they could be made of galvanized metal, or left unfinished.

First support arm 10 comprises first horizontal arm portion 11 and first vertical arm portion 12.

First vertical arm portion 12 is preferably hollow and has a square cross section of preferably 1.0 inch by 1.0 inch outside dimensions. First vertical arm portion 12 is made capable of fitting within first vertical sleeve 40, and is preferably 17 inches in length. It has a plurality of first arm mounting holes 13, a first mounting end 14, a first vertical arm extension 140, and a first vertical arm extension cover 141.

The mounting holes 13 are preferably ⅜ inch in diameter, with the first hole located preferably 5 inches from the first mounting end 14. This bottom distance to the first hole 13 is as required to ensure rigidity of the support assembly when vertical arm portion 12 is used on the highest setting. The other holes are located preferably 1 inch apart on-center. The sets of holes are located one on each of parallel opposite sides, for alignment.

First horizontal arm portion 11 is preferably hollow, 14 gauge, and has a square cross section of preferably 1.25 inches by 1.25 inches outside dimensions. It is preferably 24 inches in length. First horizontal arm portion 11 has a distal, open end 15 and proximal end 16. Proximal end 16 is secured preferably perpendicular to first vertical arm portion 12, with the top of arm 11 preferably 1⅞ inches below the top of first vertical arm extension 140. This can be accomplished preferably by welding, but can also be by other means such as bolting, provided the strength and rigidity of the support arm is not compromised.

Second support arm 20 comprises second horizontal arm portion 21 and second vertical arm portion 22.

Second vertical arm portion 22 is preferably hollow and has a preferably square cross section of preferably 1.0 inch by 1.0 inch outside dimensions. Second vertical arm portion 22 is made capable of fitting within second vertical sleeve 60, and is preferably 17 inches in length. Second vertical arm portion 22 has a plurality of second arm mounting holes 23 and first mounting end 24. The mounting holes 23 are preferably ⅜ inch in diameter, with the first hole centrally located preferably 5 inches from the first mounting end 24. This bottom distance to the first hole 23 is as required to ensure rigidity of the support assembly when vertical arm portion 22 is used on the highest setting. The other holes are located preferably 1 inches apart on center. The sets of holes are located one on each of parallel opposite sides, for alignment.

Second horizontal arm portion 21 is preferably hollow and has a square cross section of preferably 1 inch by 1 inch outside dimensions. It is preferably 48 inches in length. Second horizontal arm portion 21 has a distal, open end 25 and a proximal end 26.

Proximal end 26 is secured preferably perpendicular to second vertical arm portion 22, with the top of arm 21 preferably 2 inches below the top of second vertical arm extension 150. This can be accomplished preferably by welding, but can also be by other means such as bolting, provided the strength and rigidity of the support arm is not compromised.

Distal end 25 of second horizontal arm portion 21 is made capable of fitting within distal end 15 of first horizontal arm portion 11. Support arms 10 and 20 are capable of a sliding, adjustable, horizontal fit that enables use in a variety of widths of truck beds.

Vertical arm extension covers 141 and 151 are hollow plastic caps made to fit around the ends of vertical arm extensions 140 and 150. Covers 141 and 151 could be made of other materials such as rubber or metal, and provide a finished look to arm extensions 140 and 150. Covers 141 and 151 act to keep water from entering the opening of arm extensions 140 and 150. Arm extensions 140 and 150 act to prevent elongate members being stored from sliding off of horizontal arms 10 and 20. They also retain outer sleeve 100, keeping it from sliding off horizontal arms 10 and 20.

As shown in FIGS. 1 & 2, outer sleeve 100 is tubular, preferably made of 1¾ inch inside diameter, hollow, PVC pipe, and capable of enclosing first horizontal arm portion 11 with second horizontal arm portion 21 inserted within horizontal arm portion 11. Outer sleeve 100 is preferably 60 inches in length, and could be made of other materials such as metal or other type of plastic, as long as the strength and rigidity of the member is not compromised.

One purpose of outer sleeve 100 is to provide a rolling or sliding surface to facilitate placing elongated members 130 within the bed of a pickup truck (FIG. 1). Outer sleeve 100 acts to protect horizontal arm portions 11 and 21, and elongated members 130 from damage, such as scraping, when loading and unloading items from the truck bed. Outer sleeve 100 can be cut to the length required to fit within a variety of widths of truck beds.

Figure 3:
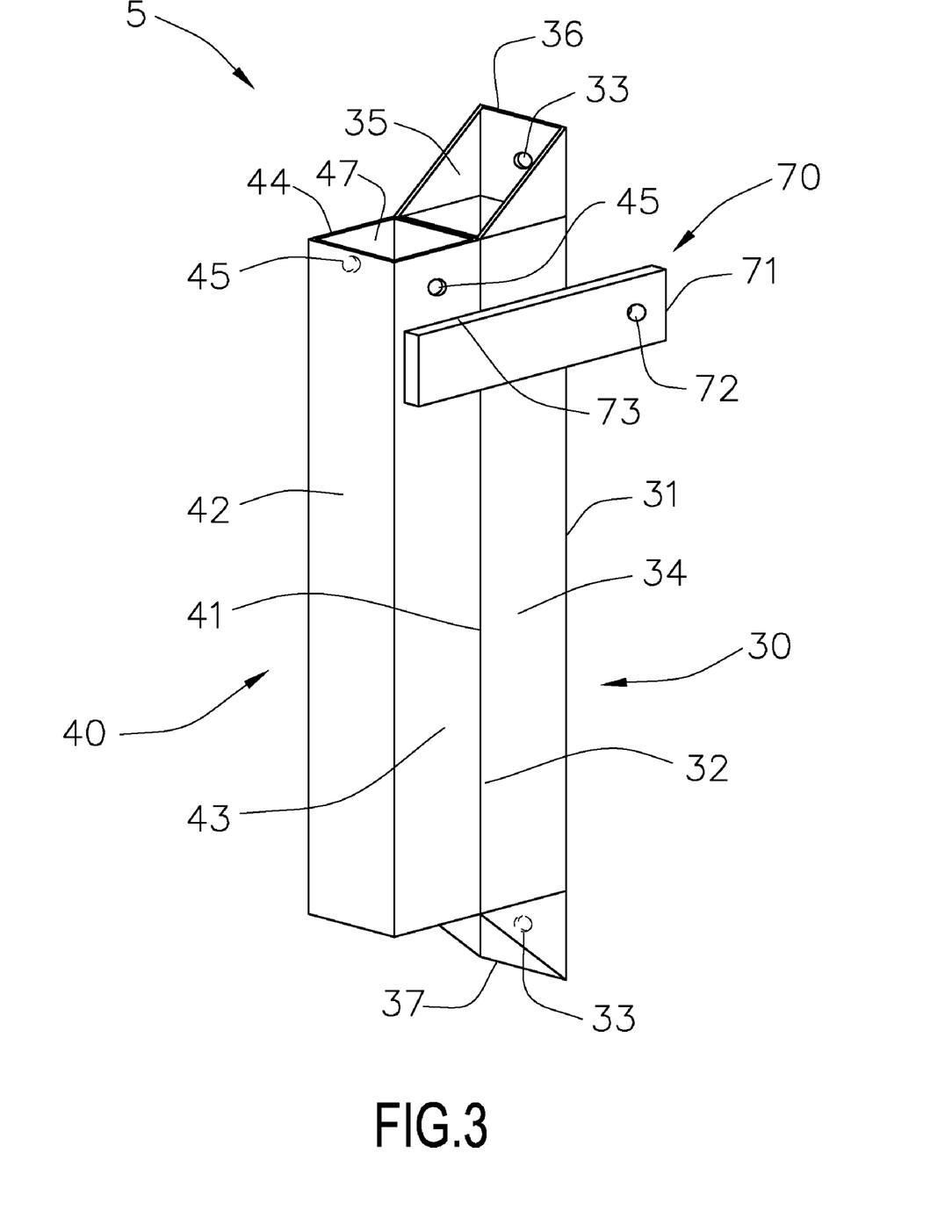
FIG. 3 depicts a perspective view of first mounting frame 5

As shown in FIG. 3, first mounting frame 5 comprises first support bracket 30, first vertical sleeve 40, first brace 70, and first hitch pin assembly 110.

First support bracket 30 comprises top portion 36, bottom portion 37, back face 31, front face 32, inner face 35, and outer face 34. The bracket 30 is hollow and has square cross section of preferably 1.25 inches by 1.25 inches outside dimensions, and is preferably 9.25 inches in length.

Back face 31 has fastening holes 33, which are preferably 9/32 inch in diameter. One hole is centrally located near top portion 36, preferably ¼ inch below, and the other hole is centrally located near bottom portion 37, preferably ¼ inch above.

Top and bottom portions 36,37 of first support bracket 30 have chamfered cuts such that front face 32 is of smaller surface area than back face 31. The chamfered cuts enable access to the fastener which is used to secure the bracket 30 to the truck bed.

First vertical sleeve 40 comprises back face 41, front face 42, inner face 47 and outer face 43. The sleeve 40 is hollow and has square cross section of preferably 1.25 inches by 1.25 inches outside dimensions, and is preferably 7 inches in length.

First vertical sleeve 40 has an upper portion 44 with mounting holes 45. The mounting holes 45 are preferably ⅜ inch in diameter, centrally located preferably 1 ¼ inches below the upper portion 44. The holes 45 are located one on each of parallel opposite sides, for alignment.

Back face 41 of first vertical sleeve 40 is securely attached to front face 32 of first support bracket 30. This can be accomplished preferably by welding, but can also be by other means such as bolting, provided the strength and rigidity of the members are not compromised.

First brace 70 is elongated and planar. The brace 70 has first mounting end 73 and second mounting end 71. Second mounting end 71 has fastening hole 72, preferably 9/32 inch in diameter, centrally located preferably 1/4 inches in from the end of second mounting end 71. Second mounting end 71 extends 1 1/4 inches beyond back face 31 of first support bracket.

As shown in FIG. 3, first brace 70 is fixedly secured to outer face 34 of first support bracket 30, and to outer face 43 of first vertical sleeve 40. This can be accomplished preferably by welding, but can also be by other means such as bolting, provided the strength and rigidity of the support arm is not compromised.

Second mounting end 71 is capable of releasable attachment to the bed of a pickup truck. This can be accomplished preferably by attachment with a common fastener through fastening hole 72 or by welding.

Figure 1A:
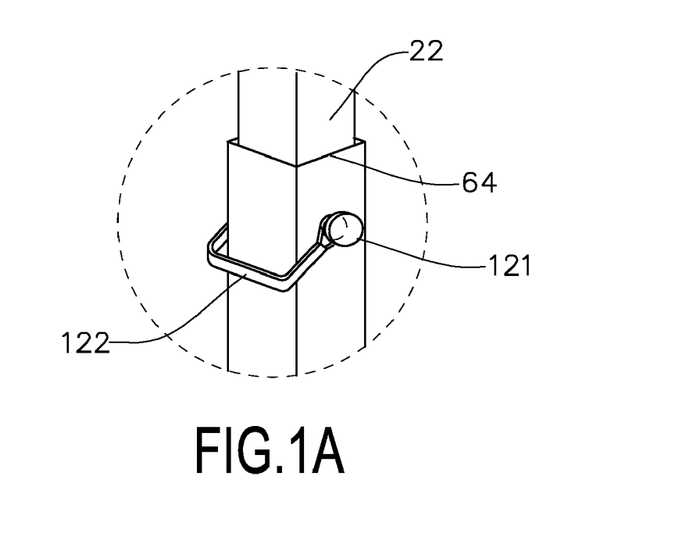
FIG. 1A depicts an enlarged view of the hitch pin assembly

As shown in FIG. 1A, first hitch pin assembly 110 comprises a first hitch pin 111 and a first hitch pin clip 112. An analogous relationship exists (not shown) for second hitch pin assembly 120 and second mounting frame 6. The pin 111 is a common fastener with size and length capable of fitting within mounting holes 13 and 45. Pin clip 112 is sized to match usage with the size and length of pin 111.

Figure 4:
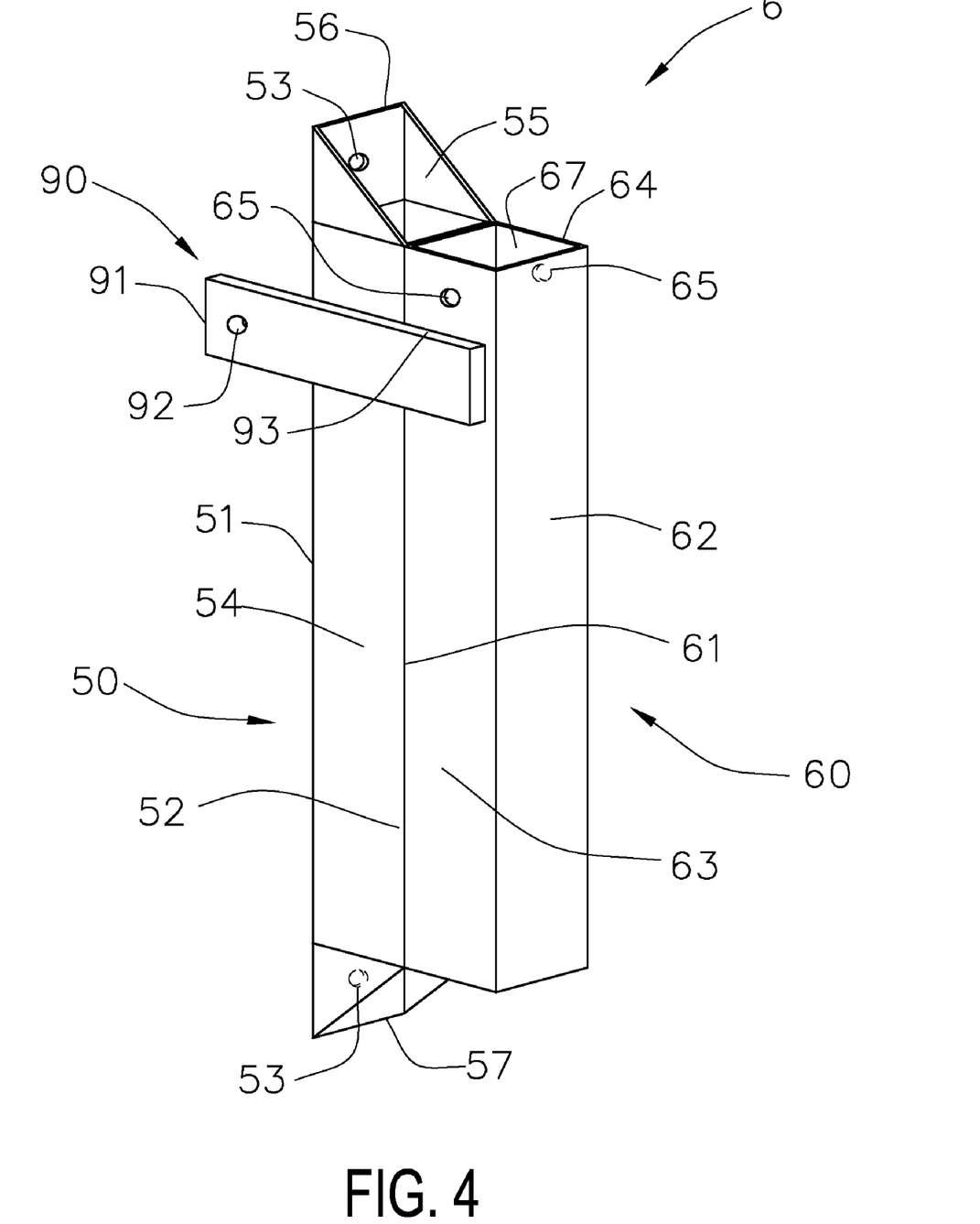
FIG. 4 depicts a perspective view of second mounting frame 6

As shown in FIG. 4, second mounting frame 6 comprises second support bracket 50, second vertical sleeve 60, second brace 90, and second hitch pin assembly 120.

Second support bracket 50 comprises top portion 56, bottom portion 57, back face 51, a front face 52, an inner face 55, and an outer face 54. The bracket 50 is hollow and has square cross section, 14 gauge, of preferably 1.25 inch by 1.25 inch outside dimensions, and is preferably 9.25 inches in length.

Back face 51 has fastening holes 53, which are preferably 9/32 inch in diameter. One hole is centrally located near top portion 56, preferably 1/4 inches below, and the other hole is centrally located near bottom portion 57, preferably 1/4 inches above.

Top and bottom portions 56, 57 of second support bracket 50 have chamfered cuts such that front face 52 is of smaller surface area than back face 51. The chamfered cuts enable access to the fastener which is used to secure the bracket 50 to the truck bed.

Second vertical sleeve 60 comprises back face 61, front face 62, inner face 67 and outer face 63. The sleeve 60 is hollow and has square cross section, 14 gauge, of preferably 1.25 inch by 1.25 inch outside dimensions, and is preferably 7 inches in length.

Second vertical sleeve 60 has an upper portion 64 with mounting holes 65. The mounting holes 65 are preferably 3/8 inch in diameter, centrally located preferably 1 1/4 inches below the upper portion 64. The holes 45 are located one on each of parallel opposite sides, for alignment.

Back face 61 of second vertical sleeve 60 is securely attached to front face 52 of second support bracket 50. This can be accomplished preferably by welding, but can also be by other means such as bolting, provided the strength and rigidity of the members are not compromised.

Second brace 90 is elongated and planar and has first mounting end 93 and second mounting end 91. Second mounting end 91 has fastening hole 92, preferably 9/32 inch in diameter, centrally located preferably 1/4 inches in from the end of second mounting end 91. Second mounting end 91 extends 1 1/4 inches beyond back face 51.

As shown in FIG. 4, second brace 90 is fixedly secured to outer face 54 of second support bracket 50 and to outer face 63 of second vertical sleeve 60. This can be accomplished preferably by welding, but can also be by other means such as bolting, provided the strength and rigidity of the support arm is not compromised.

Figure 5:
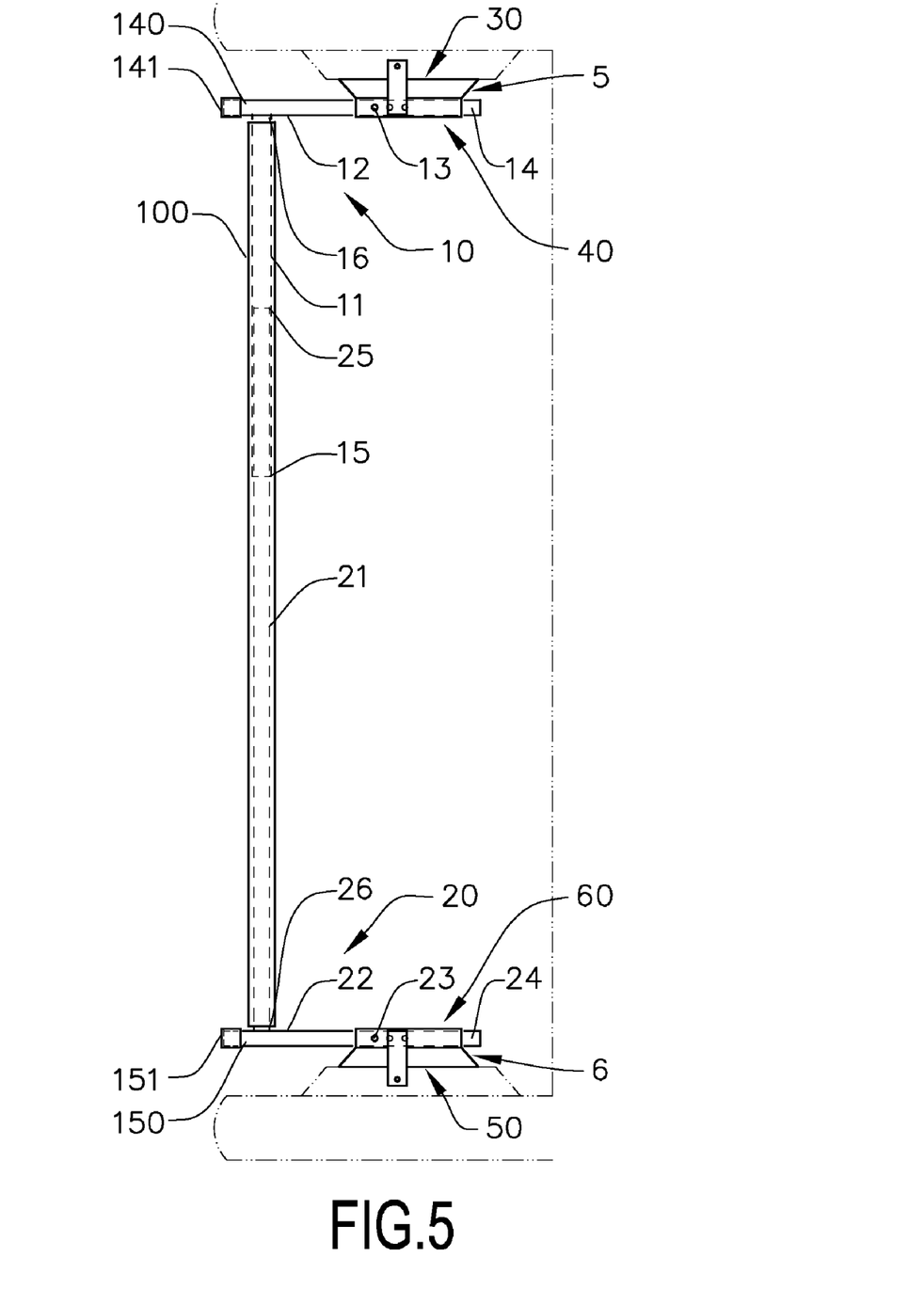
FIG. 5 depicts a view of a preferred embodiment of the invention from the perspective of the cab of a pickup truck.

Second mounting end 91 is capable of releasable attachment to the bed of a pickup truck. This can be accomplished preferably by attachment with a common fastener through fastening hole 92 or by welding. FIG. 5 depicts a view of the invention from the perspective of the cab of a pickup truck. As shown, first and second braces 70, 90 are fastened to a protrusion (also channel protrusion) in the bed of a pickup truck. Such protrusions are known in the art and are common in pickup truck beds. As will be apparent, such a means for fastening is but one of many alternatives and first and second mounting frames 5, 6 can be fastened to other types of pickup truck beds using methods apparent to those of skill in the art.

Second hitch pin assembly 120 comprises second hitch pin 121 and second hitch pin clip 122. The pin 121 is a common fastener with size and length capable of fitting within mounting holes 23 and 65. Pin clip 122 is sized to match usage with the size and length of pin 121, second arm mounting holes 23, and mounting holes 65 of second vertical sleeve.

The support arm assembly 1 is assembled by inserting the distal, open end 15 of first support arm 10 into one end of outer sleeve 100, and inserting distal, open end 25 of second support arm 20 into the opposite end of outer sleeve 100. Thereafter, distal, open end 25 of second support arm 20 can be inserted into distal, open end 15 of first support arm 10.

First mounting frame 5 can then be attached to a first truck bed channel protrusion by common fasteners through both of fastening holes 33 in back face 31 of first support bracket 30, and by common fastener through fastening hole 72 in second mounting end 71 of first brace 70.

Second mounting frame 6 can then be attached to a second truck bed channel protrusion by common fasteners through both of fastening holes 53 in back face 51 of second support bracket 50, and by common fastener through fastening hole 92 in second mounting end 91 of second brace 90.

First support arm 10 may then be releasably attached to first mounting frame 5 by first mounting end 14 of first vertical arm portion 12 being inserted into upper portion 44 of first vertical sleeve 40 and by inserting first hitch pin 111 through first arm mounting holes 13 and through mounting holes 45 of first vertical sleeve 40 and by securing first hitch pin clip 112 to first hitch pin 111. To provide an adjustable height for elevation of first support arm 10, there is preferably a plurality of sets of first arm mounting holes 13.

Second support arm 20 may then be releasably attached to second mounting frame 6 by first mounting end 24 of second vertical arm portion 22 being inserted into upper portion 64 of second vertical sleeve 60 and by inserting second hitch pin 121 through second arm mounting holes 23 and through mounting holes 65 of second vertical sleeve 60 and by securing second hitch pin clip 122 to second hitch pin 121. To provide an adjustable height for elevation of second support arm 20, there is preferably a plurality of sets of second arm mounting holes 23.

The support assembly design is such that when mounted in the lowest height position (utilizing the lowest of first arm mounting holes 13, and second arm mounting holes 23), the support unit is in storage mode, and a truck bed cover can be fastened to the truck bed without the support assembly interfering.

The support assembly can be used in a truck bed to facilitate the loading and unloading of elongated members 130, such that outer sleeve 100 of the support assembly can rotate along its longitudinal axis as the elongated members contact and slide against outer sleeve 100 perpendicular to the longitudinal axis. It is not necessary that the outer sleeve 100 rotate in order to use the support arm assembly. The use of the support arm assembly also aids in retention of large members stored in the truck bed, such that the large members would be blocked by the assembly from sliding out of the truck bed once the bed door is open.

A significant advantage is achieved because elongated members stored in a truck bed (supported by support arm assembly 1) do not have to be moved as the rear gate of the truck bed is opened and closed.

Support arms 10 and 20 can be vertically extended to their highest adjustment level by securing hitch pin 111 in the lowest mounting holes 13 and 23 of vertical arm portions 12 and 22. Operating with the support arm assembly at its highest level increases the pitch or angle of elongated member 130 relative to the truck bed. This position minimizes the opportunity for member 130 to fall out of the truck bed upon rapid acceleration.

The entire support arm assembly 1 can be completely removed from the truck bed in order to load large, bulky cargo, and then simply reinstalled.

As will be apparent, other ways are possible for slidingly engaging support arm assembly 1 to the bed of a pickup truck. For instance, magnets, compression or frictional engagement means may be employed.

Figure 6:
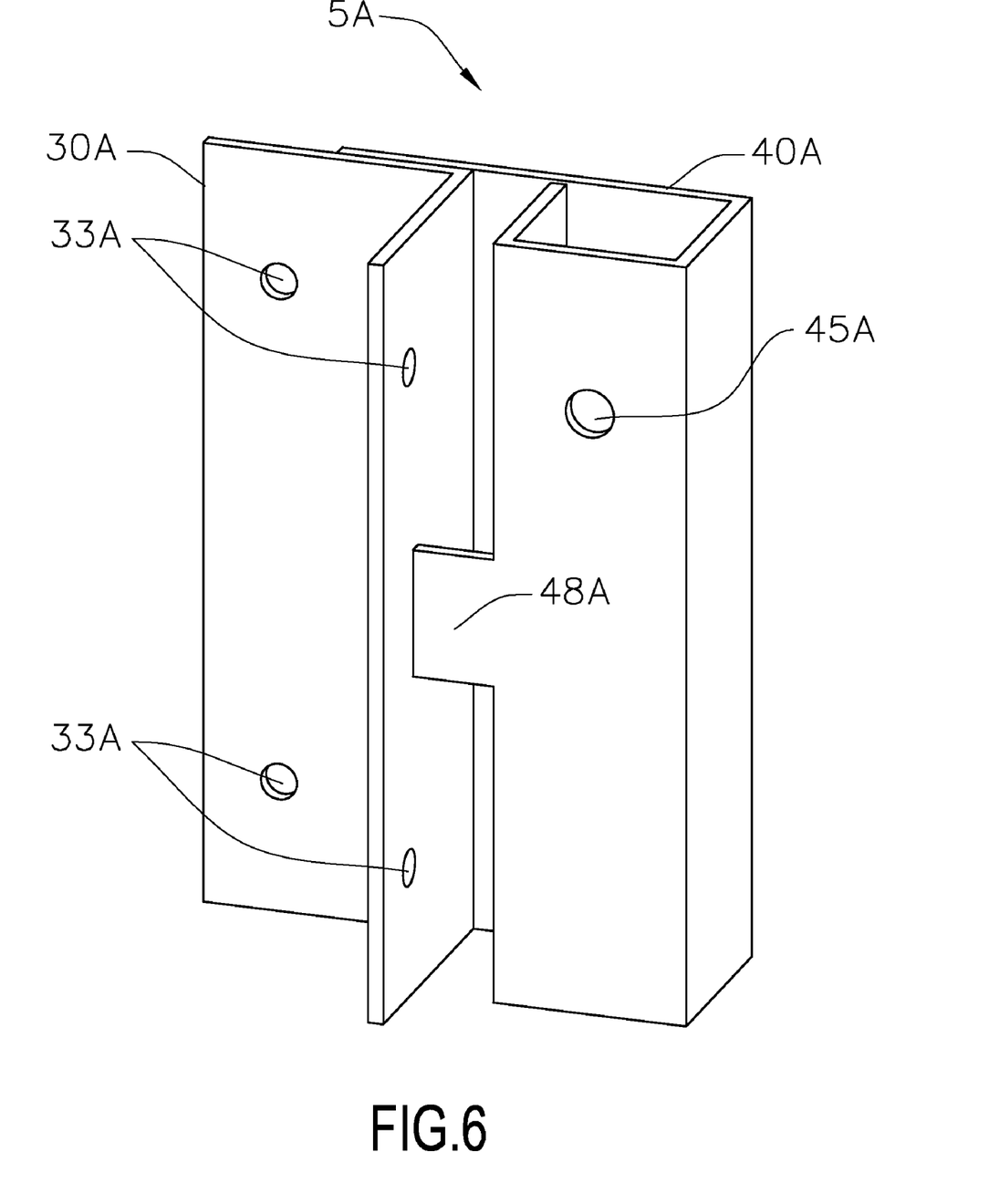
FIG. 6 depicts a perspective view of first mounting frame 5A
Figure 7:
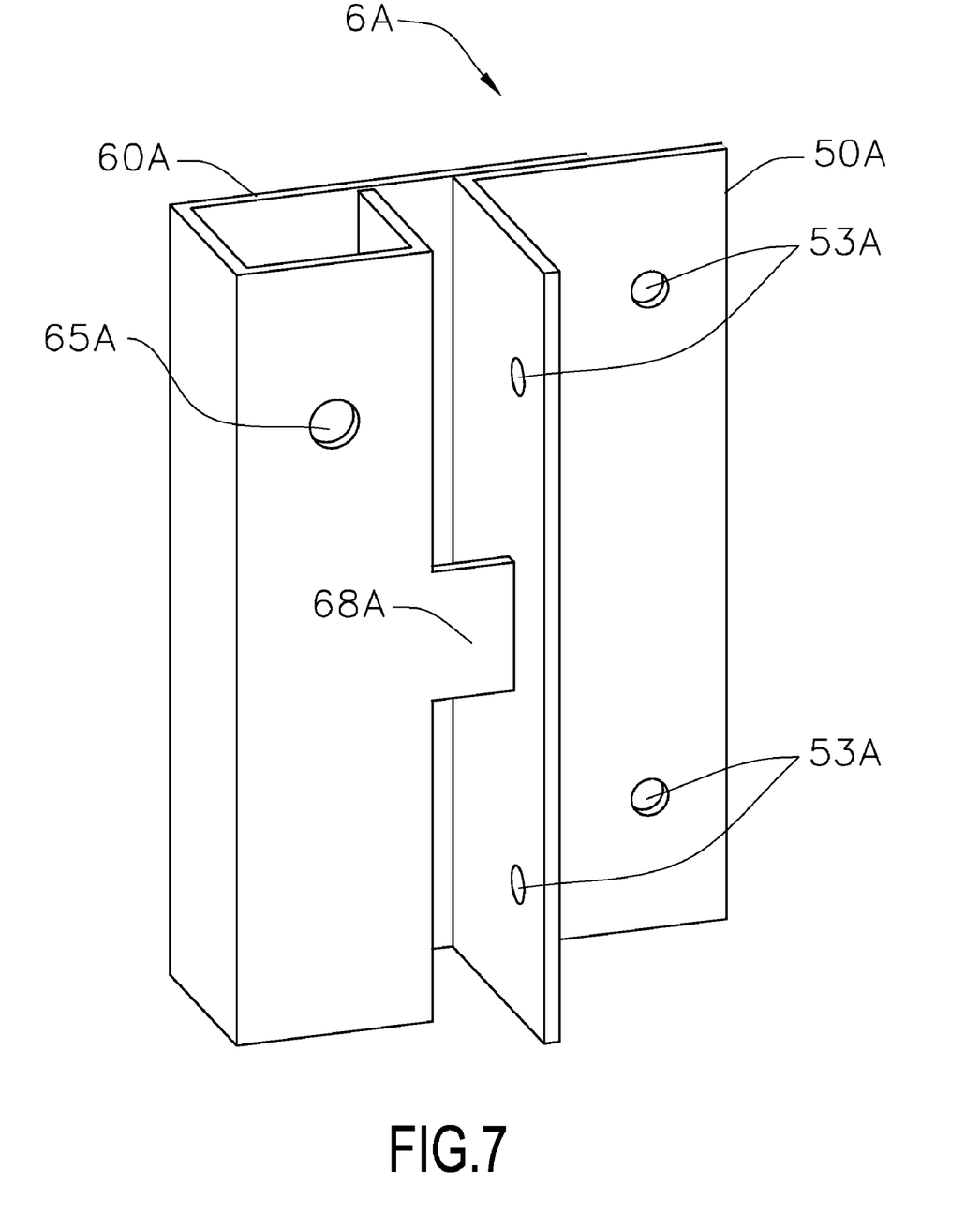
FIG. 7 depicts a perspective view of second mounting frame 6A

An alternative preferred embodiment (FIGS. 6, 7) comprises replacing first and second mounting frames 5, 6 with first and second mounting frames 5A, 6A. Essentially, first and second support bracket 30A and 50A have L-shaped cross sections. This allows them to be attached to two sides of the protrusion of a truck bed by virtue of mounting holes 33A and 35A, respectively.

first vertical sleeve 40A is securely attached to first support bracket 30A preferably by welding but other methods may be used. An analogous relationship exists for second support bracket 50A and second vertical sleeve 60A.

Tab 48A is securely attached to first support bracket 30A preferably by welding, but other methods may be used. Tab 48A is preferably an integral part of first vertical sleeve 40A, but this is not essential. Other means of secured attachment may be used. An analogous relationship exists for Tab 68A, second support bracket 50A, and second vertical sleeve 60A.

Otherwise, structure and operation of the preferred embodiment depicted in FIGS. 6 & 7 are analogous to the invention as described herein.

What is claimed is:

1. A support assembly for use with truck bed comprising:
   a support arm assembly comprising, a first support arm, a second support arm, and an outer sleeve,
      said first support arm comprising a first horizontal arm portion and a first vertical arm portion,
         said first vertical arm portion having a first mounting end, and a first vertical arm extension,
         said first horizontal arm portion having a proximal end secured to said first vertical arm portion,
         said first horizontal arm portion having a distal end,
      said second support arm comprising a second horizontal arm portion and a second vertical arm portion,
         said second vertical arm portion having a first mounting end, and a second vertical arm extension,
         said second horizontal arm portion having a proximal end secured to said second vertical arm portion,
         said second horizontal arm portion having a distal end,
      said first and second horizontal arm portions being capable of releasable attachment to each other,
      said outer sleeve being tubular and capable of enclosing said first and second horizontal arm portions;
   means for sliding engagement of said support arm assembly to a bed of a pickup truck;
   whereby said distal end of said first support arm can be inserted into one end of said outer sleeve, and said distal end of said second support arm can be inserted into an opposite end of said outer sleeve,
   further whereby said second support arm can be releasably attached to said first support arm;
   further whereby said support arm assembly can be slidingly engaged to the bed of the pickup truck;
   further whereby said support assembly can be used in said truck bed to facilitate loading and unloading of elongated members, such that said outer sleeve of said support assembly can rotate along a longitudinal axis as said elongated members contact and slide against said outer sleeve.

2. The apparatus of claim 1 further comprising,
   said distal end of said first horizontal portion being open,
   said distal end of said second horizontal arm portion being capable of fitting within said distal open end of said first horizontal arm portion,
   further whereby said first and second horizontal arm portions are capable of releasable attachment to each other by virtue of said distal, open end of said first support arm being inserted into one end of said outer sleeve, and said distal end of said second support arm being inserted into an opposite end of said outer sleeve, and said distal end of said second support arm being inserted into said distal, open end of said first support arm.

3. The apparatus of claim 1 further comprising,
   said means for sliding engagement of said support arm assembly to the bed of the pickup truck comprising,
      said first vertical arm portion having a plurality of first arm mounting holes,
      said second vertical arm portion having a plurality of second arm mounting holes,
      a first mounting frame,
         said first mounting frame comprising a first support bracket, a first vertical sleeve, a first brace, and a first hitch pin assembly,
         said first support bracket comprising a top portion, a bottom portion, a back face, a front face, an inner face, and an outer face,
            said first support bracket being hollow and having square cross section,
            said first support bracket back face having fastening holes near said top and bottom portions thereof,
            said top and bottom portions of said first support bracket having chamfered cuts such that said first support bracket front face is of smaller surface area than said first support bracket back face,
         said first vertical sleeve comprising a back face, a front face, an inner face and an outer face,
            said first vertical sleeve being hollow and having square cross section,
            said first vertical sleeve inner and outer faces having an upper portion with mounting holes,
            said back face of said first vertical sleeve being securedly attached to said front face of said first support bracket,
         said first brace being elongated and planar, said first brace having first and second mounting ends, said second mounting end having a fastening hole, said first mounting end being fixedly secured to said outer face of said first support bracket, said first mounting end being fixedly secured to said outer face of said first vertical sleeve, said second mounting end being capable of releasable attachment to the bed of the pickup truck;

said first hitch pin assembly comprising a first hitch pin and a first hitch pin clip;

a second mounting frame, said second mounting frame comprising a second support bracket, a second vertical sleeve, a second brace, and a second hitch pin assembly, said second support bracket comprising a top portion, a bottom portion, a back face, a front face, an inner face, and an outer face, said second support bracket being hollow and having square cross section, said second support bracket back face having fastening holes near said top and bottom portions thereof, said top and bottom portions of said second support bracket having chamfered cuts such that said second support bracket front face is of smaller surface area than said second support bracket back face, said second vertical sleeve comprising a back face, a front face, an inner face and an outer face, said second vertical sleeve being hollow and having square cross section, said second vertical sleeve inner and outer faces having an upper portion with mounting holes, said back face of said second vertical sleeve being securedly attached to said front face of said second support bracket, said second brace being elongated and planar, said second brace having first and second mounting ends, said second brace second mounting end having a fastening hole, said second brace first mounting end being fixedly secured to said outer face of said second support bracket, said second brace first mounting end being fixedly secured to said outer face of said second vertical sleeve, said second brace second mounting end being capable of releasable attachment to the bed of the pickup truck;

said second hitch pin assembly comprising a second hitch pin and a second hitch pin clip;

said first vertical arm portion being capable of fitting within said first vertical sleeve;

said second vertical arm portion being capable of fitting within said second vertical sleeve;

whereby said first support arm may be releasably attached to said first mounting frame by said first mounting end of said first vertical arm portion being inserted into said upper portion of said first vertical sleeve and by inserting said first hitch pin through said first arm mounting holes and through any of said mounting holes of said first vertical sleeve and by securing said first hitch pin clip to said first hitch pin;

further whereby said second support arm may be releasably attached to said second mounting frame by said first mounting end of said second vertical arm portion being inserted into said upper portion of said second vertical sleeve and by inserting said second hitch pin through said second arm mounting holes and through said any of said mounting holes of said second vertical sleeve and by securing said second hitch pin clip to said second hitch pin;

further whereby said first mounting frame can be attached to a first truck bed channel protrusion by common fasteners through said fastening holes in said back face of said first support bracket, and by common fastener through said fastening hole in said second mounting end of said first brace;

further whereby said second mounting frame can be attached to a second truck bed channel protrusion by common fasteners through said fastening holes in said back face of said second support bracket, and by common fastener through said fastening hole in said second mounting end of said second brace.

4. The apparatus of claim 1 further comprising, said means for sliding engagement of said support arm assembly to the bed of the pickup truck comprising, said first vertical arm portion having a plurality of first arm mounting holes said second vertical arm portion having a plurality of second arm mounting holes, a first mounting frame, said first mounting frame comprising a first support bracket, a first vertical sleeve, and a first hitch pin assembly;

said first vertical sleeve being securedly attached to said first support bracket, said first vertical sleeve being adapted to allow said first vertical arm portion to be inserted within, said first vertical sleeve having a mounting hole to coincide with any one of said plurality of mounting holes of said first vertical arm portion, said first hitch pin assembly comprising a first hitch pin and a first hitch pin clip;

a second mounting frame, said second mounting frame comprising a second support bracket, a second vertical sleeve, and a second hitch pin assembly;

said second vertical sleeve being securedly attached to said second support bracket, said second vertical sleeve being adapted to allow said second vertical arm portion to be inserted within, said second vertical sleeve having a mounting hole to coincide with any one of said plurality of mounting holes of said second vertical arm portion, said second hitch pin assembly comprising a second hitch pin and a second hitch pin clip;

whereby said first support arm may be releasably attached to said first mounting frame by said first mounting end of said first vertical arm portion being inserted into said first vertical sleeve and by inserting said first hitch pin through one of said arm mounting holes and through said mounting hole of said first vertical sleeve and by securing said first hitch pin clip to said first hitch pin;

further whereby said second support arm may be releasably attached to said second mounting frame by said first mounting end of said second vertical arm portion being inserted into said second vertical sleeve and by inserting said first hitch pin through one of said second arm mounting holes and through said mounting hole of said second vertical sleeve and by securing said second hitch pin clip to said second hitch pin;

further whereby said first mounting frame can be securely attached to a truck bed channel protrusion;

further whereby said second mounting frame can be securely attached to a truck bed channel protrusion.

5. The apparatus of claim 4 further comprising:
said first mounting frame having L-shaped cross section,
said second mounting frame having L-shaped cross section.

6. A support assembly for use with truck bed comprising:
a support arm assembly comprising, a first support arm, a second support arm, and an outer sleeve,
  said first support arm comprising a first horizontal arm portion and a first vertical arm portion,
    said first vertical arm portion having a plurality of first arm mounting holes and a first mounting end,
    said first horizontal arm portion having a proximal end secured to said first vertical arm portion,
    said first horizontal arm portion having a distal, open end,
  said second support arm comprising a second horizontal arm portion and a second vertical arm portion,
    said second vertical arm portion having a plurality of second arm mounting holes and a first mounting end,
    said second horizontal arm portion having a proximal end secured to said second vertical arm portion,
    said second horizontal arm portion having a distal end,
  said distal end of said second horizontal arm portion being capable of fitting within said distal end of said first horizontal arm portion,
  said outer sleeve being tubular and capable of enclosing said first and second horizontal arm portions;
a first mounting frame,
  said first mounting frame comprising a first support bracket, a first vertical sleeve, a first brace, and a first hitch pin assembly;
  said first support bracket comprising a top portion, a bottom portion, a back face, a front face, an inner face, and an outer face,
    said first support bracket being hollow,
    said back face having fastening holes near said top and bottom portions thereof,
    said top and bottom portions of said first support bracket having chamfered cuts such that said front face is of smaller surface area than said back face,
  said first vertical sleeve comprising a back face, a front face, an inner face and an outer face,
    said first vertical sleeve being hollow,
    said first vertical sleeve inner and outer faces having an upper portion with mounting holes,
  said back face of said first vertical sleeve being securedly attached to said front face of said first support bracket,
  said first brace being elongated and planar,
    said first brace having first and second mounting ends
    said first brace second mounting end having a fastening hole,
    said first brace first mounting end being fixedly secured to said outer face of said first support bracket,
    said first mounting end being fixedly secured to said outer face of said first vertical sleeve,
    said first brace second mounting end being capable of releasable attachment to a bed of a pickup truck;
  said first hitch pin assembly comprising a first hitch pin and a first hitch pin clip;
a second mounting frame,
  said second mounting frame comprising a second support bracket, a second vertical sleeve, a second brace, and a second hitch pin assembly;
  said second support bracket comprising a top portion, a bottom portion, a back face, a front face, an inner face, and an outer face,
    said second support bracket being hollow,
    said second support bracket back face having fastening holes near said top and bottom portions thereof,
    said top and bottom portions of said second support bracket having chamfered cuts such that said second support bracket front face is of smaller surface area than said second support bracket back face,
  said second vertical sleeve comprising a back face, a front face, an inner face and an outer face,
    said second vertical sleeve being hollow,
    said second vertical sleeve inner and outer faces having an upper portion with mounting holes,
  said back face of said second vertical sleeve being securedly attached to said front face of said second support bracket,
  said second brace being elongated and planar,
    said second brace having first and second mounting ends
    said second brace second mounting end having a fastening hole,
    said second brace first mounting end being fixedly secured to said outer face of said second support bracket,
    said second brace first mounting end being fixedly secured to said outer face of said second vertical sleeve,
    said second brace second mounting end being capable of releasable attachment to the bed of the pickup truck;
  said second hitch pin assembly comprising a second hitch pin and a second hitch pin clip;
said first vertical arm portion being capable of fitting within said first vertical sleeve;
said second vertical arm portion being capable of fitting within said second vertical sleeve;
whereby said first support arm may be releasably attached to said first mounting frame by said first mounting end of said first vertical arm portion being inserted into said upper portion of said first vertical sleeve and by inserting said first hitch pin through said first arm mounting holes and through said mounting holes of said first vertical sleeve and by securing said first hitch pin clip to said first hitch pin;
further whereby said second support arm may be releasably attached to said second mounting frame by said first mounting end of said second vertical arm portion being inserted into said upper portion of said second vertical sleeve and by inserting said second hitch pin through said second arm mounting holes and through said mounting holes of said second vertical sleeve and by securing said second hitch pin clip to said second hitch pin;
further whereby said distal, open end of said first support arm can be inserted into one end of said outer sleeve, and said distal end of said second support arm can be inserted into an opposite end of said outer sleeve, and said distal end of said second support arm can be inserted into said distal, open end of said first support arm;

further whereby said first mounting frame can be attached to a first truck bed channel protrusion by common fasteners through said fastening holes in said back face of said first support bracket, and by common fastener through said fastening hole in said second mounting end of said first brace;

further whereby said second mounting frame can be attached to a second truck bed channel protrusion by common fasteners through said fastening holes in said back face of said second support bracket, and by common fastener through said fastening hole in said second mounting end of said second brace;

further whereby said support assembly can be used in said truck bed to facilitate loading and unloading of elongated members, such that said outer sleeve of said support assembly can rotate along a longitudinal axis as said elongated members contact and slide against said outer sleeve.

7. A support assembly for use with truck bed comprising:
a support arm assembly comprising, a first support arm, a second support arm, and an outer sleeve,
  said first support arm comprising a first horizontal arm portion and a first vertical arm portion,
    said first vertical arm portion having a plurality of first arm mounting holes, a first mounting end, and a first vertical arm extension,
    said first horizontal arm portion having a proximal end secured to said first vertical arm portion,
    said first horizontal arm portion having a distal, open end,
  said second support arm comprising a second horizontal arm portion and a second vertical arm portion,
    said second vertical arm portion having a plurality of second arm mounting holes, a first mounting end, and a second vertical arm extension,
    said second horizontal arm portion having a proximal end secured to said second vertical arm portion,
    said second horizontal arm portion having a distal end,
    said distal end of said second horizontal arm portion being capable of fitting within said distal end of said first horizontal arm portion,
  said outer sleeve being tubular and capable of enclosing said first and second horizontal arm portions;
a first mounting frame,
  said first mounting frame comprising a first support bracket, a first vertical sleeve, a first brace, and a first hitch pin assembly;
  said first support bracket comprising a top portion, a bottom portion, a back face, a front face, an inner face, and an outer face,
    said first support bracket being hollow and having square cross section,
    said back face having fastening holes near said top and bottom portions thereof,
    said top and bottom portions of said first support bracket having chamfered cuts such that said front face is of smaller surface area than said back face,
  said first vertical sleeve comprising a back face, a front face, an inner face and an outer face,
    said first vertical sleeve being hollow and having square cross section,
    said first vertical sleeve inner and outer faces having an upper portion with mounting holes,
  said back face of said first vertical sleeve being securedly attached to said front face of said first support bracket,
  said first brace being elongated and planar,
    said first brace having first and second mounting ends
    said first brace second mounting end having a fastening hole,
    said first brace first mounting end being fixedly secured to said outer face of said first support bracket,
    said first brace first mounting end being fixedly secured to said outer face of said first vertical sleeve,
    said first brace second mounting end being capable of releasable attachment to a bed of a pickup truck;
  said first hitch pin assembly comprising a first hitch pin and a first hitch pin clip;
a second mounting frame,
  said second mounting frame comprising a second support bracket, a second vertical sleeve, a second brace, and a second hitch pin assembly;
  said second support bracket comprising a top portion, a bottom portion, a back face, a front face, an inner face, and an outer face,
    said second support bracket being hollow and having square cross section,
    said second support bracket back face having fastening holes near said top and bottom portions thereof,
    said top and bottom portions of said second support bracket having chamfered cuts such that said second support bracket front face is of smaller surface area than said second support bracket back face,
  said second vertical sleeve comprising a back face, a front face, an inner face and an outer face,
    said second vertical sleeve being hollow and having square cross section,
    said second vertical sleeve inner and outer faces having an upper portion with mounting holes,
  said back face of said second vertical sleeve being securedly attached to said front face of said second support bracket,
  said second brace being elongated and planar,
    said second brace having first and second mounting ends
    said second brace second mounting end having a fastening hole,
    said second brace first mounting end being fixedly secured to said outer face of said second support bracket,
    said second brace first mounting end being fixedly secured to said outer face of said second vertical sleeve,
    said second brace second mounting end being capable of releasable attachment to the bed of the pickup truck;
  said second hitch pin assembly comprising a second hitch pin and a second hitch pin clip;
said first vertical arm portion being capable of fitting within said first vertical sleeve;
said second vertical arm portion being capable of fitting within said second vertical sleeve;
whereby said first support arm may be releasably attached to said first mounting frame by said first mounting end of said first vertical arm portion being inserted into said upper portion of said first vertical sleeve and by inserting said first hitch pin through said first arm mounting holes and through said mounting holes of said first vertical sleeve and by securing said first hitch pin clip to said first hitch pin;
further whereby said second support arm may be releasably attached to said second mounting frame by said first mounting end of said second vertical arm portion being inserted into said upper portion of said second vertical sleeve and by inserting said second hitch pin through said second arm mounting holes and through said mounting holes of said second vertical sleeve and by securing said second hitch pin clip to said second hitch pin;

further whereby said distal, open end of said first support arm can be inserted into one end of said outer sleeve, and said distal end of said second support arm can be inserted into an opposite end of said outer sleeve, and said distal end of said second support arm can be inserted into said distal, open end of said first support arm;

further whereby said first mounting frame can be attached to a first truck bed channel protrusion by common fasteners through said fastening holes in said back face of said first support bracket, and by common fastener through said fastening hole in said second mounting end of said first brace;

further whereby said second mounting frame can be attached to a second truck bed channel protrusion by common fasteners through said fastening holes in said back face of said second support bracket, and by common fastener through said fastening hole in said second mounting end of said second brace;

further whereby said support assembly can be used in said truck bed to facilitate loading and unloading of elongated members, such that said outer sleeve of said support assembly can rotate along a longitudinal axis as said elongated members contact and slide against said outer sleeve.

* * * * *